(12) United States Patent
Asfaw et al.

(10) Patent No.: US 12,167,218 B2
(45) Date of Patent: *Dec. 10, 2024

(54) HEAD-WEARABLE APPARATUS TO GENERATE BINAURAL AUDIO

(71) Applicant: Snap Inc., Santa Monica, CA (US)

(72) Inventors: Michael Asfaw, Playa Del Rey, CA (US); Dunxu Hu, Venice, CA (US); Patrick Timothy McSweeney Simons, Downey, CA (US); Victoria Lulu Wang Limketkai, Santa Monica, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,804

(22) Filed: Apr. 6, 2023

(65) Prior Publication Data

US 2023/0247378 A1 Aug. 3, 2023

Related U.S. Application Data

(63) Continuation of application No. 17/303,534, filed on Jun. 1, 2021, now Pat. No. 11,632,640, which is a
(Continued)

(51) Int. Cl.
*H04S 1/00* (2006.01)
*H04N 23/54* (2023.01)
(Continued)

(52) U.S. Cl.
CPC ............. *H04S 1/007* (2013.01); *H04N 23/54* (2023.01); *H04R 1/406* (2013.01); *H04R 3/005* (2013.01); *H04S 2400/15* (2013.01)

(58) Field of Classification Search
CPC ..... H04S 1/007; H04S 2400/15; H04N 23/54; H04R 1/406; H04R 3/005
See application file for complete search history.

(56) References Cited

U.S. PATENT DOCUMENTS

| 9,973,849 B1 | 5/2018 | Zhang et al. |
| 10,567,898 B1 | 2/2020 | Asfaw |

(Continued)

FOREIGN PATENT DOCUMENTS

| CN | 102077607 | 5/2011 |
| CN | 102111706 | 6/2011 |

(Continued)

OTHER PUBLICATIONS

"U.S. Appl. No. 16/370,190, Notice of Allowance mailed Sep. 27, 2019", 10 pgs.
(Continued)

*Primary Examiner* — Andrew Sniezek
(74) *Attorney, Agent, or Firm* — SCHWEGMAN LUNDBERG & WOESSNER, P.A.

(57) ABSTRACT

Head-wearable apparatus to generate binaural audio content includes a first stem coupled to a first microphone housing that encases first front microphone and first rear microphone that generates acoustic signals, respectively. First microphone housing includes a first front port that faces downward and a first rear port that faces backwards. Apparatus includes second stem coupled to second microphone housing that encases second front microphone and second rear microphone that generate acoustic signals, respectively. Second microphone housing includes second front port that faces downward and second rear port that faces backwards. Apparatus includes binaural audio processor that includes beamformer and storage device. Beamformer generate first beamformer signal based on acoustic signals from first front microphone and first rear microphone, and second beamformer based on acoustic signals from second front microphone and second rear microphone. Storage device stores first and second beamformer signals as a two-channel file.

20 Claims, 7 Drawing Sheets

Related U.S. Application Data continuation of application No. 16/732,899, filed on Jan. 2, 2020, now Pat. No. 11,044,568, which is a continuation of application No. 16/370,190, filed on Mar. 29, 2019, now Pat. No. 10,567,898.

(51) Int. Cl.
*H04R 1/40* (2006.01)
*H04R 3/00* (2006.01)

(56) References Cited

U.S. PATENT DOCUMENTS

| | | | |
|---|---|---|---|
| 11,044,568 | B2 | 6/2021 | Asfaw et al. |
| 11,069,368 | B2* | 7/2021 | Lipman .................. G10L 15/26 |
| 11,342,051 | B1 | 5/2022 | Jain et al. |
| 11,361,781 | B2 | 6/2022 | Asfaw et al. |
| 11,632,640 | B2 | 4/2023 | Asfaw et al. |
| 2003/0151534 | A1* | 8/2003 | Lambert ............. H03M 3/3283 341/143 |
| 2004/0175008 | A1 | 9/2004 | Roeck et al. |
| 2007/0030442 | A1 | 2/2007 | Howell et al. |
| 2007/0098192 | A1 | 5/2007 | Sipkema |
| 2009/0252360 | A1 | 10/2009 | Sipkema et al. |
| 2011/0091057 | A1 | 4/2011 | Derkx |
| 2012/0020485 | A1 | 1/2012 | Visser et al. |
| 2014/0093091 | A1 | 4/2014 | Dusan et al. |
| 2014/0185845 | A1 | 7/2014 | Udesen |
| 2014/0270231 | A1 | 9/2014 | Dusan et al. |
| 2014/0270244 | A1 | 9/2014 | Fan |
| 2015/0170632 | A1 | 6/2015 | Olsson |
| 2015/0341734 | A1 | 11/2015 | Sherman |
| 2016/0100258 | A1 | 4/2016 | Bekri |
| 2016/0192073 | A1 | 6/2016 | Poornachandran et al. |
| 2016/0316304 | A1 | 10/2016 | Sprague et al. |
| 2017/0303052 | A1 | 10/2017 | Kakareka et al. |
| 2017/0358239 | A1 | 12/2017 | Arney et al. |
| 2019/0038216 | A1 | 2/2019 | Ser et al. |
| 2019/0258315 | A1 | 8/2019 | Djokovic et al. |
| 2020/0184043 | A1 | 6/2020 | Li et al. |
| 2020/0314577 | A1 | 10/2020 | Asfaw et al. |
| 2020/0411026 | A1 | 12/2020 | Asfaw et al. |
| 2021/0125609 | A1 | 4/2021 | Dusan et al. |
| 2021/0290105 | A1 | 9/2021 | Lee |
| 2021/0306751 | A1 | 9/2021 | Roach et al. |
| 2021/0345055 | A1 | 11/2021 | Asfaw et al. |
| 2021/0350821 | A1 | 11/2021 | Laberge et al. |
| 2022/0165393 | A1 | 5/2022 | Inz et al. |
| 2022/0175309 | A1 | 6/2022 | Vardas et al. |
| 2022/0175313 | A1 | 6/2022 | Chaiwala |
| 2022/0192622 | A1 | 6/2022 | Arya et al. |
| 2022/0366926 | A1 | 11/2022 | Asfaw et al. |

FOREIGN PATENT DOCUMENTS

| | | | |
|---|---|---|---|
| CN | 104717587 | | 6/2015 |
| CN | 105532017 | | 4/2016 |
| CN | 108464015 | | 8/2018 |
| CN | 111696575 | | 9/2020 |
| CN | 113647116 | | 11/2021 |
| CN | 114073101 | | 2/2022 |
| CN | 116685263 | | 9/2023 |
| EP | 2884763 | | 6/2015 |
| KR | 102506593 | | 3/2023 |
| KR | 102608630 | | 11/2023 |
| WO | 9326085 | | 12/1993 |
| WO | 2009132646 | | 11/2009 |
| WO | WO-2016188270 | A1* | 12/2016 ............. H04R 25/04 |
| WO | 2020205194 | | 10/2020 |
| WO | 2020264299 | | 12/2020 |
| WO | 2021084488 | | 5/2021 |
| WO | 2021198941 | | 10/2021 |
| WO | 2022133410 | | 6/2022 |

OTHER PUBLICATIONS

"U.S. Appl. No. 16/732,899, Examiner Interview Summary mailed Sep. 27, 2019", 1 pg.
"U.S. Appl. No. 16/370,190, PTO Response to Rule 312 Communication mailed Jan. 21, 2020", 2 pgs.
"U.S. Appl. No. 16/370,190, Amendment under 37 C.F.R. 1.312 filed Dec. 27, 2019", 8 pgs.
"International Application Serial No. PCT/US2020/022311, International Search Report mailed Jun. 24, 2020", 5 pgs.
"International Application Serial No. PCT/US2020/022311, Written Opinion mailed Jun. 24, 2020", 5 pgs.
"U.S. Appl. No. 16/732,899, Non Final Office Action mailed Jul. 28, 2020", 8 pgs.
"U.S. Appl. No. 16/732,899, Response filed Oct. 28, 2020 to Non Final Office Action mailed Jul. 28, 2020", 9 pgs.
"International Application Serial No. PCT/US2020/039826, International Search Report mailed Oct. 15, 2020", 4 pgs.
"International Application Serial No. PCT/US2020/039826, Written Opinion mailed Oct. 15, 2020", 8 pgs.
"U.S. Appl. No. 16/732,899, Notice of Allowance mailed Feb. 23, 2021", 8 pgs.
"U.S. Appl. No. 16/732,899, Notice of Allowability mailed Apr. 15, 2021", 5 pgs.
"U.S. Appl. No. 17/303,534, Preliminary Amendment filed Jul. 27, 2021", 8 pgs.
"U.S. Appl. No. 16/913,289, Non Final Office Action mailed Sep. 2, 2021", 14 pgs.
"International Application Serial No. PCT/US2020/022311, International Preliminary Report on Patentability mailed Oct. 14, 2021", 7 pgs.
"U.S. Appl. No. 16/913,289, Response filed Dec. 2, 2021 to Non Final Office Action mailed Sep. 2, 2021", 11 pgs.
"International Application Serial No. PCT/US2020/039826, International Preliminary Report on Patentability mailed Jan. 6, 2022", 10 pgs.
"U.S. Appl. No. 16/913,289, Notice of Allowance mailed Feb. 16, 2022", 10 pgs.
"International Application Serial No. PCT/US2021/072861, International Search Report mailed Apr. 4, 2022", 5 pgs.
"International Application Serial No. PCT/US2021/072861, Written Opinion mailed Apr. 4, 2022", 6 pgs.
"U.S. Appl. No. 16/913,289, Notice of Allowability mailed May 5, 2022", 2 pgs.
"U.S. Appl. No. 17/303,534, Non Final Office Action mailed Jul. 5, 2022", 12 pgs.
"U.S. Appl. No. 17/839,236, Preliminary Amendment filed Aug. 3, 2022", 8 pgs.
"Korean Application Serial No. 10-2021-7034744, Notice of Preliminary Rejection mailed Sep. 5, 2022", w/ English Translation, 4 pgs.
"Chinese Application Serial No. 202080047279.2, Office Action mailed Sep. 2, 2022", w/ English translation, 7 pgs.
"U.S. Appl. No. 17/303,534, Response filed Oct. 5, 2022 to Non Final Office Action mailed Jul. 5, 2022", 11 pgs.
"European Application Serial No. 20743430.9, Response to Communication Pursuant to Rules 161 and 162 EPC filed Aug. 15, 2022", 16 pgs.
"European Application Serial No. 20717461.6, Communication Pursuant to Article 94(3) EPC mailed Nov. 16, 2022", 7 pgs.
"U.S. Appl. No. 17/303,534, Notice of Allowance mailed Dec. 2, 2022", 7 pgs.
"U.S. Appl. No. 17/303,534, Supplemental Notice of Allowability mailed Jan. 9, 2023", 2 pgs.
"European Application Serial No. 20743430.9, Communication Pursuant to Article 94(3) EPC mailed Jan. 2, 2023", 8 pgs.
"U.S. Appl. No. 17/839,236, Non Final Office Action mailed Mar. 16, 2023", 21 pgs.
"Chinese Application Serial No. 202080047279.2, Office Action mailed Feb. 16, 2023", w/ English Translation, 4 pgs.
"U.S. Appl. No. 17/839,236, Non Final Office Action mailed Mar. 21, 2023", 22 pgs.

(56) References Cited

OTHER PUBLICATIONS

"Chinese Application Serial No. 202080047279.2, Response filed Jan. 5, 2023 to Office Action mailed Sep. 2, 2022", w/ English Claims, 10 pgs.

"Korean Application Serial No. 10-2021-7034744, Response filed Nov. 7, 2022 to Notice of Preliminary Rejection mailed Sep. 5, 2022", w/ English Claims, 15 pgs.

"Korean Application Serial No. 10-2023-7007297, Notice of Preliminary Rejection mailed May 10, 2023", w/ English Translation, 11 pgs.

Wang, Anran, "Contactless Infant Monitoring using White Noise", Mobile Computing and Networking, ACM, 2 Penn Plaza, Suite 701New YorkNY10121-0701USA, (Oct. 11, 2019), 1-16.

"U.S. Appl. No. 17/456,096, Non Final Office Action mailed Oct. 12, 2023", 21 pgs.

"Chinese Application Serial No. 202180084819.9, Voluntary Amendment filed Dec. 15, 2023", w English claims, 9 pgs.

"U.S. Appl. No. 17/456,096, Response filed Jan. 10, 24 to Non Final Office Action mailed Oct. 12, 2023", 12 pgs.

"Chinese Application Serial No. 202080024964.3, Office Action mailed Feb. 8, 2024", w English translation, 16 pgs.

"U.S. Appl. No. 17/456,096, Advisory Action mailed Jun. 11, 2024", 4 pgs.

"U.S. Appl. No. 17/456,096, Final Office Action mailed Apr. 1, 2024", 21 pgs.

"U.S. Appl. No. 17/456,096, Response filed May 31, 2024 to Final Office Action mailed Apr. 1, 2024", 10 pgs.

"Korean Application Serial No. 10-2023-7040956, Notice of Preliminary Rejection mailed May 22, 2024", w/ English translation, 6 pgs.

"U.S. Appl. No. 17/456,096, Non Final Office Action mailed Jul. 12, 2024", 23 pgs.

\* cited by examiner

HEAD-WEARABLE APPARATUS TO GENERATE BINAURAL AUDIO

CLAIM OF PRIORITY

This application is a continuation of and claims the benefit of priority of U.S. patent application Ser. No. 17/303,534, filed Jun. 1, 2021, which application is a continuation of and claims the benefit of priority of U.S. patent application Ser. No. 16/732,899, filed Jan. 2, 2020, now issued as U.S. Pat. No. 11,044,568, which is a continuation of and claims the benefit of priority of U.S. patent application Ser. No. 16/370,190, filed Mar. 29, 2019, now issued as U.S. Pat. No. 10,567,898, all of which are hereby incorporated by reference herein in their entireties.

BACKGROUND

Currently, a number of consumer electronic devices are adapted to capture audio and/or visual content. For example, a user can use the built-in cameras on a mobile device to quickly capture an event or moment occurring in the user's life.

However, the time that is required to retrieve the mobile device may still be too lengthy to capture some events or moments that are fleeting. Users may also feel as though they have to remove themselves from being present and living the event or moment in order to retrieve their mobile device. Further, when played back, the audio portion of the content that was recorded using the mobile device may not adequately recreate the sound as perceived by the user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

To improve on audio recording that is captured by current electronic mobile devices, some embodiments of the disclosure are directed to a head-wearable apparatus 100 that can capture audio content, which when played back, is an imitation of the sound as perceived by the user of the head-wearable apparatus 100. Specifically, the head-wearable apparatus 100 can record audio using microphones that are arranged to create 3-dimensional (3D) sound sensation for the listener as if present when the audio was recorded. This is called binaural audio. The playback of the captured audio content will have the effect of binaural audio that has the stereo separation and the spectral content that would mimic a human ear and head response. The design of the head-wearable apparatus 100 uses, among other things, the diffraction pattern of the human head, the placement of the microphones on both sides of the head, and beamforming techniques.

Figure 1:
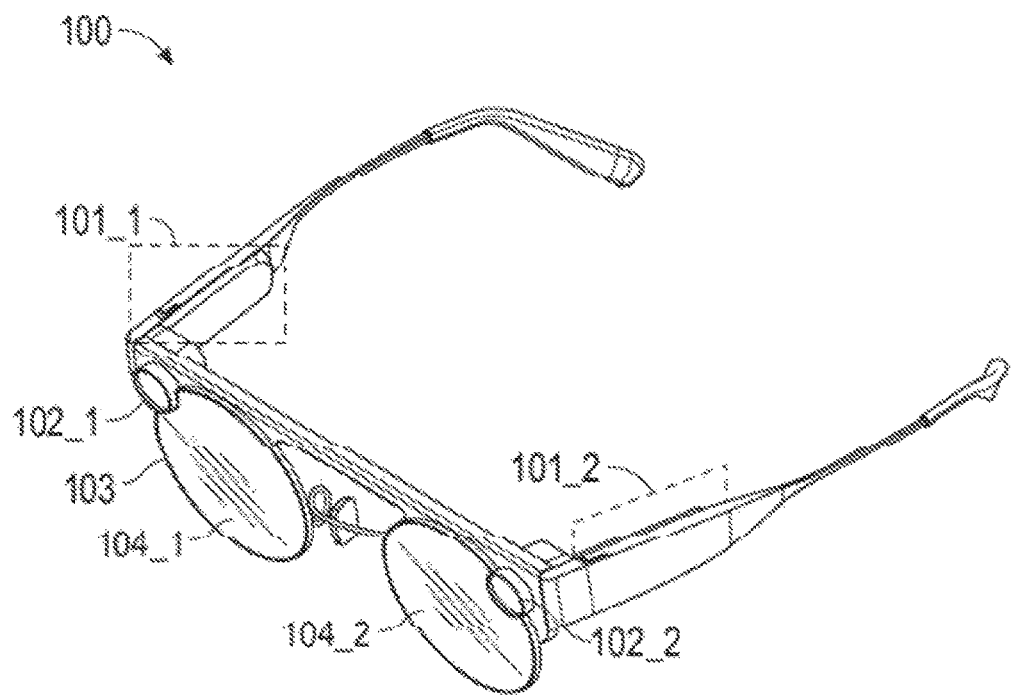
FIG. 1 illustrates a perspective view of a head-wearable apparatus to generate binaural audio according to one example embodiment.
Figure 2:
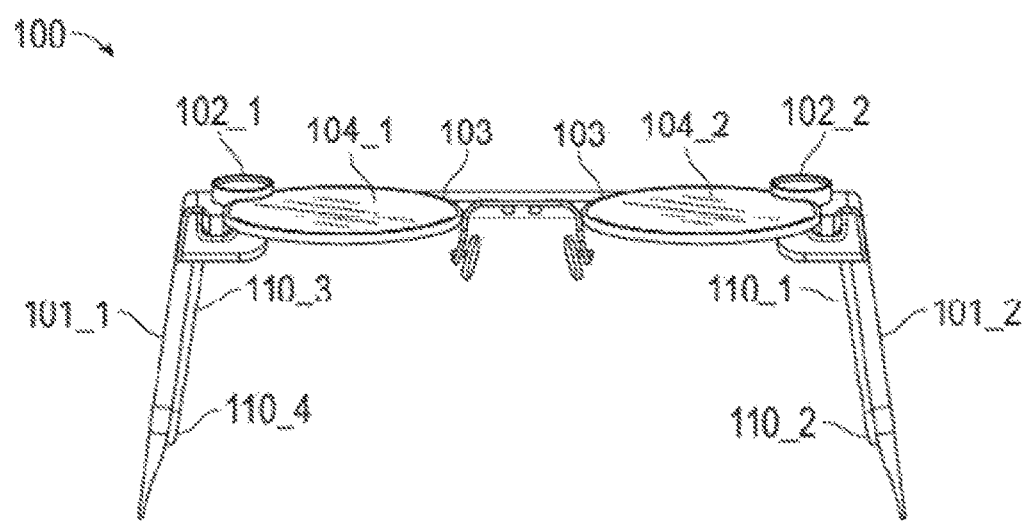
FIG. 2 illustrates a bottom view of the head-wearable apparatus from FIG. 1, according to one example embodiment.
Figure 5:
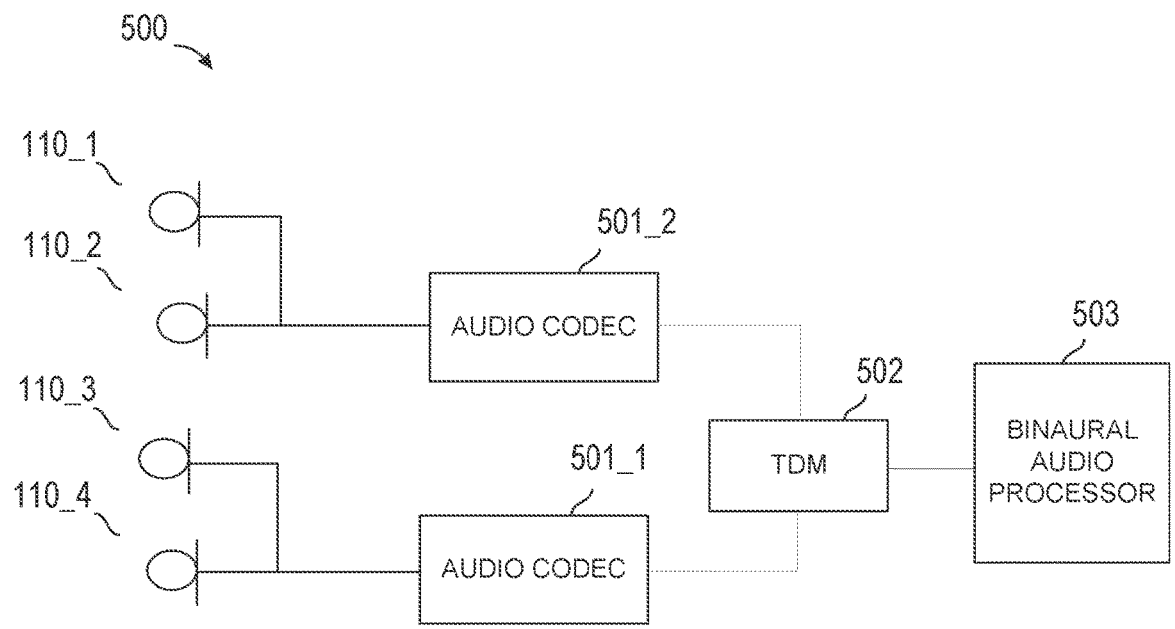
FIG. 5 illustrates a block diagram of a system to generate binaural audio included in the head-wearable apparatus from FIG. 1, according to one example embodiment.
Figure 6:
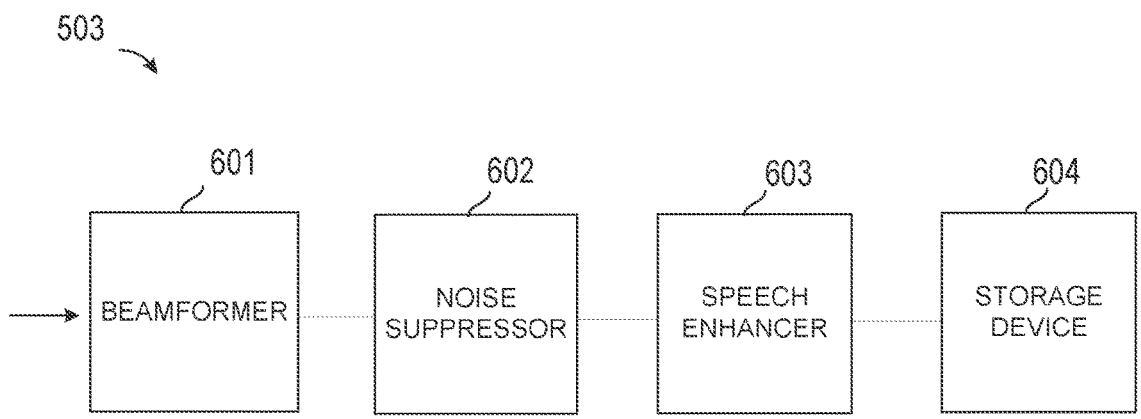
FIG. 6 illustrates a block diagram of the binaural audio processor included in the system in FIG. 5, according to one example embodiment.

FIG. 1 illustrates a perspective view of a head-wearable apparatus 100 to generate binaural audio according to one example embodiment. FIG. 2 illustrates a bottom view of the head-wearable apparatus 100 from FIG. 1, according to one example embodiment. In FIG. 1 and FIG. 2, the head-wearable apparatus 100 is a pair of eyeglasses. In some embodiments, the head-wearable apparatus 100 can be sunglasses or goggles. Some embodiments can include one or more wearable devices, such as a pendant with an integrated camera that is integrated with, in communication with, or coupled to, the head-wearable apparatus 100 or a client device. Any desired wearable device may be used in conjunction with the embodiments of the present disclosure, such as a watch, a headset, a wristband, earbuds, clothing (such as a hat or jacket with integrated electronics), a clip-on electronic device, or any other wearable devices. It is understood that, while not shown, one or more portions of the system included in the head-wearable apparatus can be included in a client device (e.g., machine 800 in FIG. 8) that can be used in conjunction with the head-wearable apparatus 100. For example, one or more elements as shown in FIG. 5 and FIG. 6 can be included in the head-wearable apparatus 100 and/or the client device.

As used herein, the term "client device" may refer to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In FIG. 1 and FIG. 2, the head-wearable apparatus 100 is a pair of eyeglasses that includes a frame 103 that includes eye wires (or rims) that are coupled to two stems (or temples), respectively, via hinges and/or end pieces. The eye wires of the frame 103 carry or hold a pair of lenses 104_1, 104_2. The frame 103 includes a first (e.g., right) side that is coupled to the first stem and a second (e.g., left) side that is coupled to the second stem. The first side is opposite the second side of the frame 103.

The apparatus 100 further includes a camera module that includes camera lenses 102_1, 102_2 and at least one image sensor. The camera lens may be a perspective camera lens or a non-perspective camera lens. A non-perspective camera lens may be, for example, a fisheye lens, a wide-angle lens, an omnidirectional lens, etc. The image sensor captures digital video through the camera lens. The images may be also be still image frame or a video including a plurality of still image frames. The camera module can be coupled to the frame 103. As shown in FIGS. 1 and 2, the frame 103 is coupled to the camera lenses 102_1, 102_2 such that the camera lenses face forward. The camera lenses 102_1, 102_2 can be perpendicular to the lenses 104_1, 104_2. The camera module can include dual-front facing cameras that are separated by the width of the frame 103 or the width of the head of the user of the apparatus 100.

In FIGS. 1 and 2, the two stems (or temples) are respectively coupled to microphone housings 101_1, 101_2. The first and second stems are coupled to opposite sides of a frame 103 of the head-wearable apparatus 100. The first stem is coupled to the first microphone housing 101_1 and the second stem is coupled to the second microphone housing 101_2. The microphone housings 101_1, 101_2 can be coupled to the stems between the locations of the frame 103 and the temple tips. The microphone housings 101_1, 101_2 can be located on either side of the user's temples when the user is wearing the apparatus 100.

As shown in FIG. 2, the microphone housings 101_1, 101_2 encase a plurality of microphones 110_1 to 110_N (N>1). The microphones 110_1 to 110_N are air interface sound pickup devices that convert sound into an electrical signal. More specifically, the microphones 110_1 to 110_N are transducers that convert acoustic pressure into electrical signals (e.g., acoustic signals). Microphones 110_1 to 110_N can be digital or analog microelectro-mechanical systems (MEMS) microphones. The acoustic signals generated by the microphones 110_1 to 110_N can be pulse density modulation (PDM) signals.

In FIG. 2, the first microphone housing 101_1 encases microphones 110_3 and 110_4 and the second microphone housing 101_2 encases microphones 110_1 and 110_2. In the first microphone housing 101_1, the first front microphone 110_3 and the first rear microphone 110_4 are separated by a predetermined distance d1 and form a first order differential microphone array. In the second microphone housing 101_2, the second front microphone 110_1 and the second rear microphone 110_2 are also separated by a predetermined distance d2 and form a first order differential microphone array. The predetermined distances d1 and d2 can be the same distance or different distances. The predetermined distances d1 and d2 can be set based on the Nyquist frequency. Content above the Nyquist frequency for a beamformer is irrecoverable, especially for speech. The Nyquist frequency is determined by the equation:

$$Nf = \frac{c}{2*d}$$

In this equation, c is the speed of sound and d is the separation between the microphones. Using this equation, in one embodiment, the predetermined distances $d_1$ and $d_2$ can be set as any value of d that results in a frequency above 6 kHz, which is the cutoff for Wideband speech.

While, in FIG. 1, the system 100 includes four microphones 110_1 to 110_4, the number of microphones can vary. In some embodiment, the microphone housings 101_1, 101_2 can include at least two microphones and can form a microphone array. Each of the microphone housings 101_1, 101_2 can also include a battery.

A user naturally perceives audio with two ears separated by the head such that the user is able to distinguish the direction from which sound arrives. Accordingly, by placing the microphone housings 101_1, 101_2 on the stems of the head-wearable apparatus 100, the head-wearable apparatus 100 can achieve capturing the sound as perceived by the user wearing the head-wearable apparatus 100.

Referring to FIG. 2, each of the microphone housings 101_1, 101_2 includes a front port and a rear port. The front port of the first microphone housing 101_1 is coupled to microphone 110_3 (e.g. first front microphone) and the rear port of the first microphone housing 101_1 is coupled to the microphone 110_4 (e.g., first rear microphone). The front port of the second microphone housing 101_2 is coupled to microphone 110_1 (e.g. second front microphone) and the rear port of the second microphone housing 101_2 is coupled to the microphone 110_2 (e.g., second rear microphone). In one embodiment, the microphones 101_1 to 101_4 can be moved further towards the temple tips on the stems of the apparatus 100 (e.g., the back of the apparatus 100) to accentuate the binaural effect captured by the microphones.

Figure 3A:
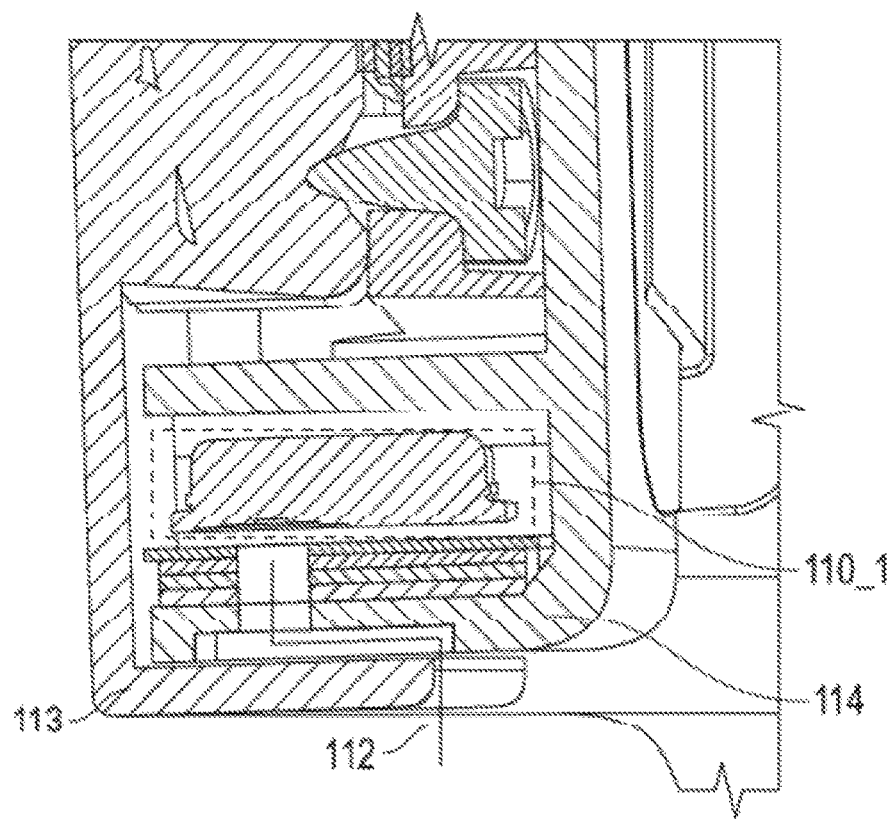
FIG. 3A-3B illustrates details of portions of one microphone housing of the head-wearable apparatus from FIG. 1, according to example embodiments.
Figure 3B:
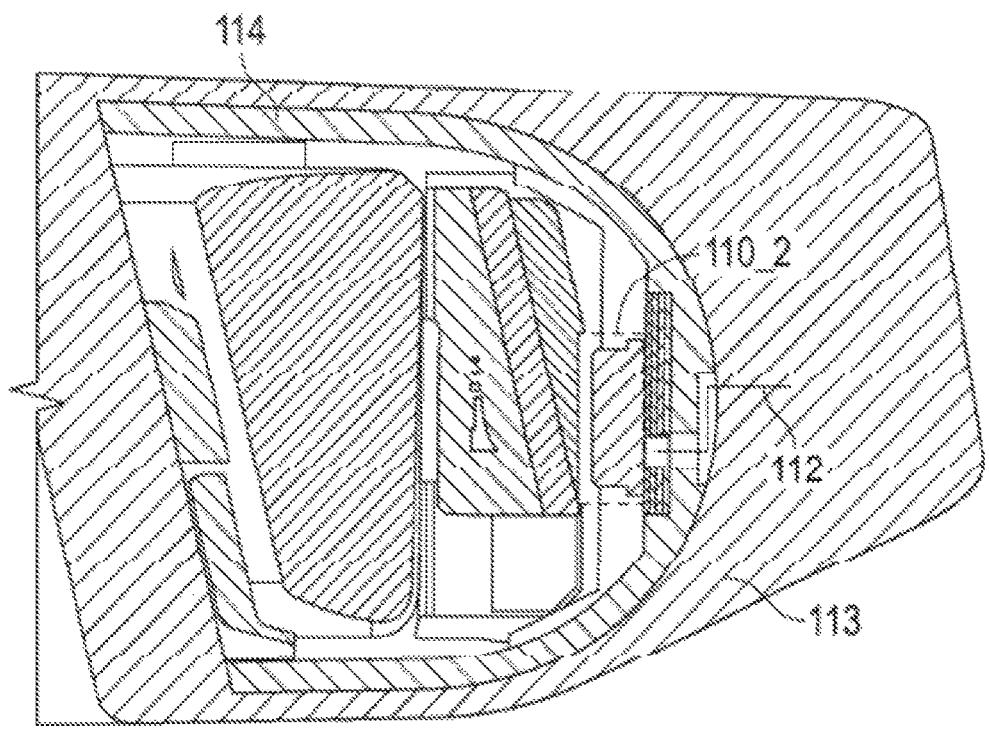

FIG. 3A-3B illustrates details of portions of one microphone housing of the head-wearable apparatus from FIG. 1, according to example embodiments. Specifically, FIG. 3A illustrates the details of the microphone 110_1 (e.g. second front microphone) and the front port associated therewith. While FIG. 3A illustrates the details of the microphone 110_1 coupled to the front port in the second microphone housing 101_2, it is understood that the details of the microphone 110_3 (e.g., first front microphone) coupled to the front port in the first microphone housing 101_1 are similar to the details in FIG. 3A.

FIG. 3A is a cutaway view of the front microphone 110_1 and the acoustic path 112. As shown, the acoustic path 112 travels through the separation between the chunk 114 (e.g., second microphone housing 101_2) and a housing 113 of the second stem. The housing 113 of the stem can be made of metal. The front microphone 110_1 and the front port are pointing (or facing) downwards. For example, when the user is standing and wearing the apparatus 100, the front port in FIG. 3A is open in a direction towards the user's feet on the ground. This design allows for the front acoustic port length and the acoustic mass to be at a minimum whilst ensuring that the front microphone 110_1 is protected in a pocket that can reduce the effect of noise (e.g., wind noise turbulence, etc.).

FIG. 3B illustrates details of another portion of the head-wearable apparatus from FIG. 1, according to one example embodiment. Specifically, FIG. 3B illustrates the details of the microphone 110_2 (e.g. second rear microphone) and the rear port associated therewith. While FIG. 3B illustrates the details of the microphone 110_2 coupled to the rear port in the second microphone housing 101_2, it is understood that the details of the microphone 110_4 (e.g., first rear microphone) coupled to the rear port in the first microphone housing 101_1 are similar to the details in FIG. 3B.

FIG. 3B is a cutaway view of the rear microphone 110_2 and the acoustic path 112. As shown, the acoustic path 112 travels through a separation between the chunk 114 (e.g., second microphone housing 101_2) and a housing 113 of the second stem. The housing 113 of the stem in FIG. 3B can also be made of metal. The rear microphone 110_2 and the rear port are pointing (or facing) backwards. For example, when the user is wearing the apparatus 100, the rear port in FIG. 3B is open in a direction towards the back of the user's head or the rear of the apparatus 100 (e.g., towards the temple end). With the porting being backwards in this embodiment, direct wind contact with the rear port is avoided when the user wears the apparatus 100. This design further allows for the rear acoustic port length and the acoustic mass to be at a minimum whilst ensuring that the rear microphone 110_2 is protected in a pocket that can reduce the effect of noise (e.g., wind noise turbulence, etc.). In one embodiment, a mechanical filter can be applied to the rear microphone 110_2 to further improve noise immunity.

As shown in FIGS. 3A-3B, the microphones 110_1 to 110_4 can be part of a microphone assembly stackup that includes a flexible circuit board and a pressure sensitive adhesive (PSA) stackup that includes a waterproof membrane sandwiched between PSA layers. The waterproof membrane can protect the microphones 110_1 to 110_4 from water ingress and air leaks. The PSA stackup is then coupled to a microphone assembly housing. In some embodiments, the microphone assembly housing is the chunk 114 or the housing 113 of the second stem.

Figure 4:
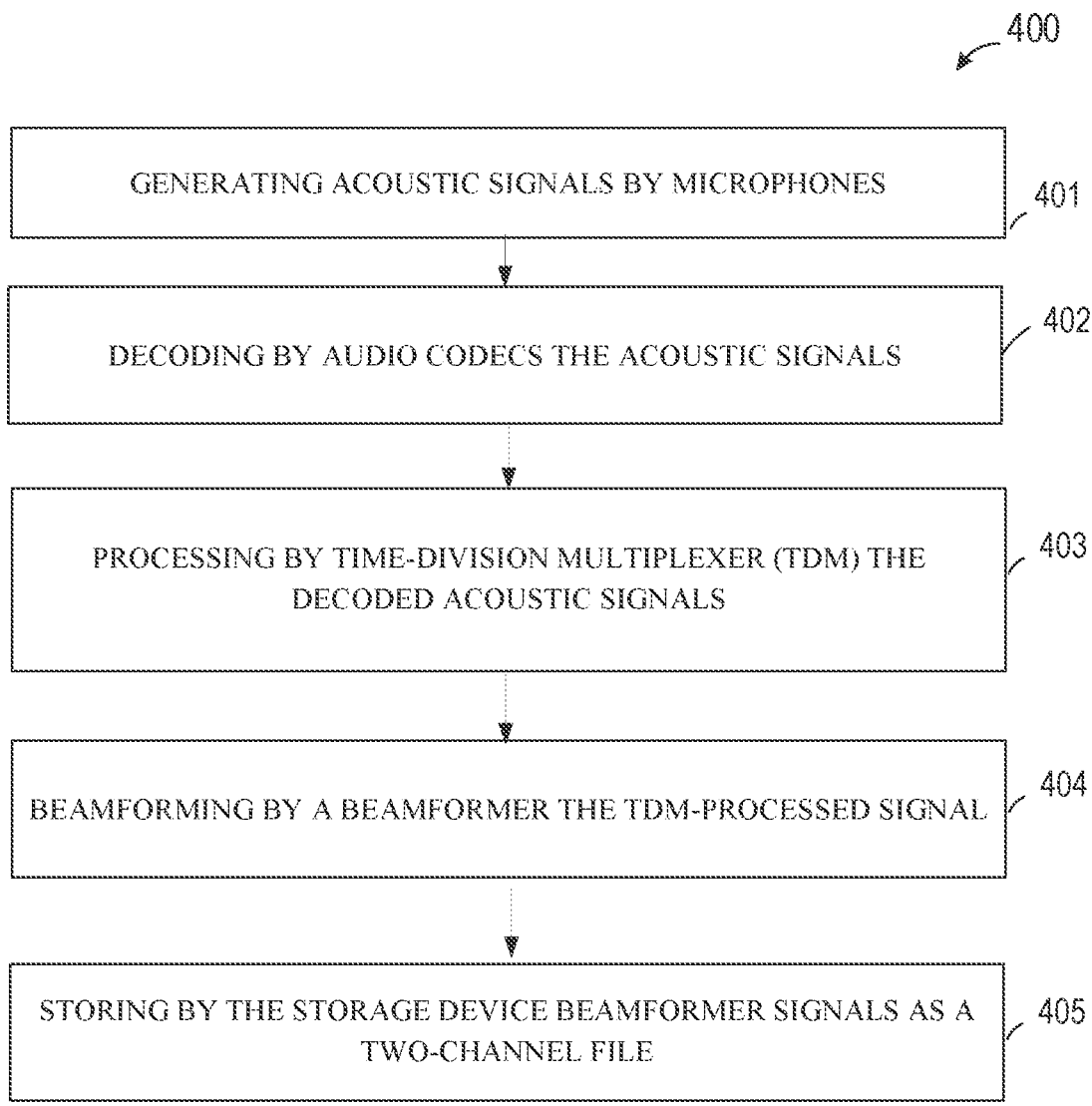
FIG. 4 is an exemplary flow diagram of a process of generating binaural audio using a head-wearable apparatus from FIG. 1 according to various aspects of the disclosure.

FIG. 4 is an exemplary flow diagram of a process of generating binaural audio using a head-wearable apparatus 100 from FIG. 1 according to various aspects of the disclosure. Although the flowchart may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in FIG. 1 and/or FIG. 8. The process 400 may also be performed by a processor included in head-wearable apparatus 100 in FIG. 1 or by a processor included in a client device 800 of FIG. 8.

The process 400 starts at operation 401 with microphones 110_1 to 110_4 generating acoustic signals. The microphones 110_1 to 110_4 can be MEMS microphones that convert acoustic pressure into electrical signals (e.g., acoustic signals). The first front microphone 110_3 and the first rear microphone 110_4 are encased in a first microphone 101_1 housing that is coupled on a first stem of the head-wearable apparatus 100. The first front microphone 110_3 and the first rear microphone 110_4 form a first order differential microphone array. The second front microphone 110_1 and the second rear microphone 110_2 are encased in a second microphone housing 101_2 that is coupled on a second stem of the head-wearable apparatus 100. The second front microphone 110_1 and the second rear microphone 110_2 form a first order differential microphone array. The first and second stems are coupled to opposite sides of a frame 103 of the head-wearable apparatus 100. The acoustic signals can be pulse density modulation (PDM) signals.

At operation 402, the audio codecs 501_1, 501_2 decode the acoustic signals from the microphones 110_1 to 110_4. The audio codec 501_2 decodes the acoustic signals from the first front microphone 110 and the first rear microphone 110_4 to generate a first decoded acoustic signal and the audio codec 501_1 decodes the second front microphone 110_1 and the second rear microphone 110_2 to generate a second decoded acoustic signal. The first and second decoded acoustic signals are pulse code modulation (PCM) signals. The first decoded acoustic signal is a PCM signal based on the acoustic signals from the first front microphone 110_3 and the first rear microphone 110_4. The second decoded acoustic signal is a PCM signal based on the acoustic signals from the second front microphone 110_1 and the second rear microphone 110_2.

At operation 403, the TDM 502 processes the decoded acoustic signals from the audio codecs 501_1, 501_2. The TDM 502 processes the first and second decoded acoustic signals by time division multiplexing the first and second decoded acoustic signals. The TDM-processed signal includes the first decoded acoustic signal and the second decoded acoustic signal.

At operation 404, the beamformer 601 beamforms the TDM-processed signal. As further described below, the beamformer 601 can be a fixed beamformer that includes a fixed beam patterns that is sub-cardioid or cardioid. The beamformer 601 beamforms the first decoded signal to generate a first beamformer signal and beamforms the second decoded signal to generate a second beamformer signal.

At operation 405, the storage device 604 stores the beamformer signals as a two-channel file. The two-channel file can be a two-channel PCM file or a two-channel Advanced Audio Coding (AAC)/PCM file. The storage device 604 can be a flash storage device.

In one embodiment, a noise suppressor 602 suppresses noise from the first beamformer signal and the second beamformer signal and generates a first noise-suppressed signal and a second noise-suppressed signal. A speech enhancer 603 can enhance speech from the first noise-suppressed signal and the second noise-suppressed signal to generate a first clean signal and a second clean signal, respectively. In this embodiment, the storage device 604 stores the first and second clean signal as a two-channel PCM file.

FIG. 5 illustrates a block diagram of a system 500 to generate binaural audio included in the head-wearable apparatus 100 from FIG. 1, according to one example embodiment. In some embodiments, one or more portions of the system 500 can be included in the head-wearable apparatus 100 or can be included in a client device (e.g., machine 800 in FIG. 8) that can be used in conjunction with the head-wearable apparatus 100.

System 500 includes the microphones 110_1 to 110_N, audio codecs 501_1, 501_2, a time-division multiplexer (TDM) 502, and a binary audio processor 503. The first front microphone 110_3 and the first rear microphone 110_4 encased in the first microphone housing 101_1 form a first-order differential microphone array. Similarly, the second front microphone 110_1 and the second rear microphone 110_2 encased in the second microphone housing 101_2 form another first-order differential microphone array. The microphones 110_1 to 110_4 can be analog or digital MEMS microphones. The acoustic signals generated by the microphones 110_1 to 110_4 can be pulse density modulation (PDM) signals.

The audio codec 501_1 decodes the acoustic signals from the first front microphone 110_3 and the first rear microphone 110_4 to generate a first decoded acoustic signal. The audio codec 501_2 decodes the acoustic signals from the second front microphone 110_1 and the second rear microphone 110_2 to generate a second decoded acoustic signal. The first and second decoded acoustic signals can be pulse code modulation (PCM) signals. In one embodiment, the audio codecs 501_1, 501_2 decode the acoustic signals that are PDM signals from a single-bit PDM format into a multibit pulse code modulation (PCM) format. The audio codecs 501_1, 501_2 can include PDM inputs with filters that convert the PDM signals to PCM format. In one embodiment, the audio codecs 501_1, 501_2 use a microcontroller with a synchronous serial interface to capture the PDM data stream from the microphones 110_1 to 110_4 and convert the PDM data stream into PCM format using the filters implemented in software.

The PCM signals can be interpreted by an interface of the binaural audio processor 503. In some embodiments, binaural audio processor 503 is a Silicon-on-Chip (SoC). The SoC can include an interface, such as the I2S interface, to receive and interpret the PCM signals.

In one embodiment, the interface of the binaural audio processor 503 can only handle one packet (e.g., 2 channels of audio), the time-division multiplexer (TDM) 502 in the system 500 receives and process the first and second decoded acoustic signals (e.g., PCM signals) to generate a TDM-processed signal. The TDM 502 time-division multiplexes the first and second decoded acoustic signals to generate the TDM-processed signal. In one embodiment, the system 500 further oversamples the TDM-processed signal to allow for an input the four microphone signals. The system 500 can also include switches to create extra slots to allow for the microphone signals.

In one embodiment, the microphones 110_1 to 110_4 are digital MEMS microphones. The acoustic signals generated by digital MEMS microphones are relatively immune to noise, but signal integrity can still be a concern due to distortion created by parasitic capacitance, resistance, and inductance between the microphones 110_1 to 110_4 outputs and the SoC such as the binaural audio processor 503. Impedance mismatches can also create reflections that can distort the signals in applications with longer distances between the digital microphones 110_1 to 110_4 and the SoC. In one embodiment, the microphones 110_1 to 110_4 are attached to flexible circuits designed to maximize signal integrity and also minimize the trace length between the elements. In this embodiment, the flexible circuits are encased in the microphone housings 101_1, 101_2.

FIG. 6 illustrates a block diagram of the binaural audio processor 503 included in the system 500 in FIG. 5, according to one example embodiment. The binaural audio processor 503 includes a beamformer 601, a noise suppressor 602, a speech enhancer 603, and a storage device 604.

In one embodiment, the binaural audio processor 503 includes an interface that receives the TDM-processed signal. As discussed above, the TDM-processed signal is generated from the acoustic signals from the first front microphone 110_3, the first rear microphone 110_4, the second front microphone 110_1 and the second rear microphone 110_2. In one embodiment, the microphones 110_1 to 110_4 are digital MEMS microphones which are inherently omnidirectional.

The beamformer 601, which has direction steering properties, is a differential beamformer that allows for a flat frequency response except for the Nyquist frequency. The beamformer 601 uses the transfer functions of a first-order differential microphone array. The transfer functions for the first-order differential microphone array is as follows for two microphones:

$$h_1 + h_2 e^{-jw\frac{d}{c}\cos\theta} = 1$$
$$h_1 + h_2 e^{-jw\frac{d}{c}\cos\beta} = 0$$

In these equations above, theta $\theta$ is the angle and beta $\beta$ is at 180 degrees, the equation simplifies to E=A+B cos 0, for a fixed frequency (or frequency independent) beam (e.g., beamformer signal). E in the simplified equation is the fixed frequency output of the beamformer. In one embodiment, the beamformer 601 is a fixed beamformer that includes a fixed beam pattern that is sub-cardioid with A and B coefficients of 0.25 and 0.75, respectively. In one embodiment, the beamformer 601 is a fixed beamformer that includes a fixed beam pattern that is cardioid with A and B coefficients of 0.5 and 0.5, respectively.

In one embodiment, the beamformer 601 receives the acoustic signals from the first front microphone 110_3, the first rear microphone 110_4, the second front microphone 110_1 and the second rear microphone 110_2. In one embodiment, the beamformer 601 receives the TDM-processed signal. The beamformer 601 generates a first beamformer signal based on the acoustic signals from the first front microphone 110_3 and the first rear microphone 110_4, and a second beamformer signal based on the acoustic signals from the second front microphone 110_1 and the second rear microphone 110_2. The storage device 604 can store the first and second beamformer signal as a two-channel file.

The noise suppressor 602 suppresses noise from the first beamformer signal and the second beamformer signal. The noise suppressor 602 is a two-channel noise suppressor and generates a first noise-suppressed signal and a second noise-suppressed signal. In one embodiment, the noise suppressor 602 can implement a noise suppressing algorithm.

The speech enhancer 603 enhances speech from the first noise-suppressed signal and the second noise-suppressed signal to generate a first clean signal and a second clean signal. In one embodiment, the speech enhancer 603 can implement a model-based speech enhancement. The speech enhancer 603 can perform a search for a plurality of speech signatures in the first and second noise-suppressed signals. When the speech enhancer 603 identifies portions in the first and second noise-suppressed signals that match at least one of the speech signatures, the speech enhancer 603 enhances or emphasizes the identified portions. In one embodiment, the speech enhancer 603 can implement a speech enhancement algorithm.

The storage device 604 stores the first and second clean signal from the speech enhancer 603 as a two-channel file. The two-channel file can be a two-channel PCM file (or two-channel AAC/PCM file) that represents the left and right channels. Storage device 604 can be a flash storage device.

Figure 7:
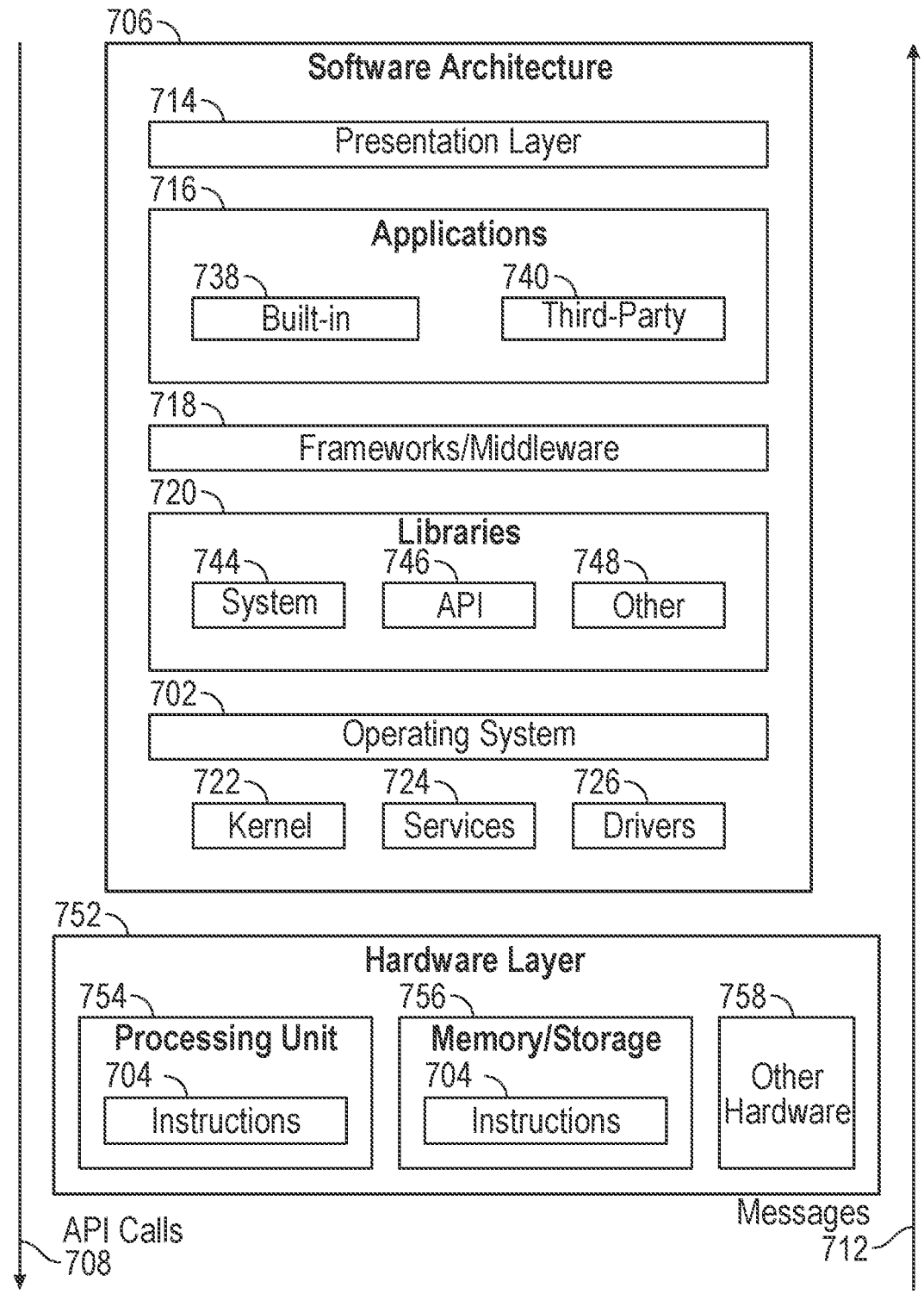
FIG. 7 is a block diagram illustrating a representative software architecture, which may be used in conjunction with various hardware architectures herein described.

FIG. 7 is a block diagram illustrating an exemplary software architecture 706, which may be used in conjunction with various hardware architectures herein described. FIG. 7 is a non-limiting example of a software architecture and it will be appreciated that many other architectures may be implemented to facilitate the functionality described herein. The software architecture 706 may execute on hardware such as machine 8 of FIG. 8 that includes, among other things, processors 804, memory 814, and I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components and so forth described herein. The hardware layer 752 also includes memory or storage modules memory/storage 756, which also have executable instructions 704. The hardware layer 752 may also comprise other hardware 758.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 7, the software architecture 706 may be conceptualized as a stack of layers where each layer provides particular functionality. For example, the software architecture 706 may include layers such as an operating system 702, libraries 720, applications 716 and a presentation layer 714. Operationally, the applications 716 or other components within the layers may invoke application programming interface (API) API calls 708 through the software stack and receive messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724 and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 916 or other components or layers. The libraries 720 provide functionality that allows other software components to perform tasks in an easier fashion than to interface directly with the underlying operating system 702 functionality (e.g., kernel 722, services 724 or drivers 726). The libraries 720 may include system libraries 744 (e.g., C standard library) that may provide functions such as memory allocation functions, string manipulation functions, mathematical functions, and the like. In addition, the libraries 720 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 716 or other software components/modules, some of which may be specific to a particular operating system 702 or platform.

The applications 716 include built-in applications 738 or third-party applications 940. Examples of representative built-in applications 738 may include, but are not limited to, a contacts application, a browser application, a book reader application, a location application, a media application, a messaging application, or a game application. Third-party applications 740 may include an application developed using software development kit (SDK) by an entity other than the vendor of the particular platform and may be mobile software running on a mobile operating system. The third-party applications 740 may invoke the API calls 708 provided by the mobile operating system (such as operating system 702) to facilitate functionality described herein.

The applications 716 may use built in operating system functions (e.g., kernel 722, services 724 or drivers 726), libraries 720, and frameworks/middleware 718 to create user interfaces to interact with users of the system. Alternatively, or additionally, in some systems interactions with a user may occur through a presentation layer, such as presentation layer 714. In these systems, the application/component "logic" can be separated from the aspects of the application/component that interact with a user.

Figure 8:
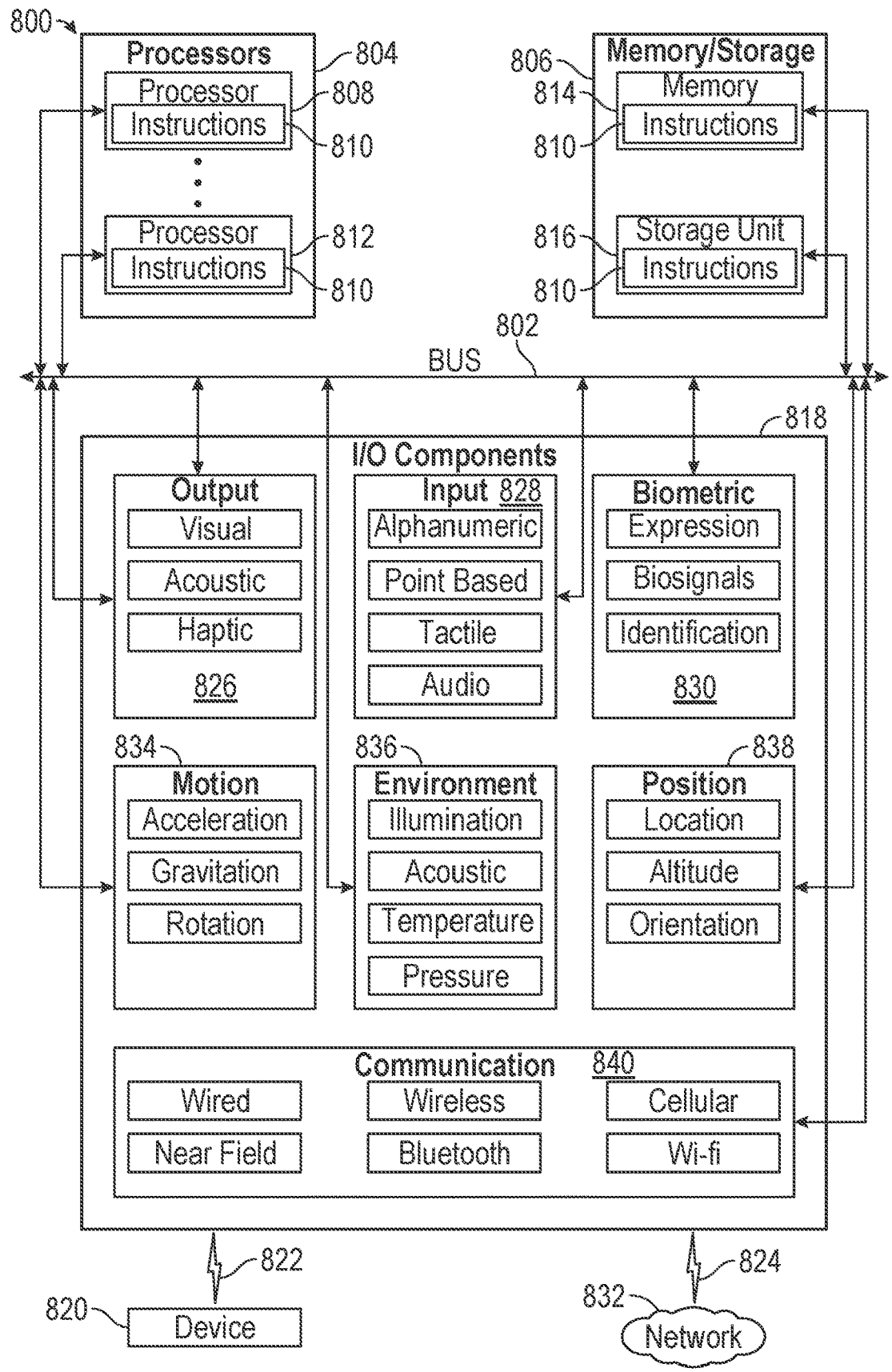
FIG. 8 is a block diagram illustrating components of a machine, according to some exemplary embodiments, able to read instructions from a machine-readable medium (e.g., a machine-readable storage medium) and perform any one or more of the methodologies discussed herein.

FIG. 8 is a block diagram illustrating components (also referred to herein as "modules") of a machine 800, according to some exemplary embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by machine 800. Further, while only a single machine 800 is illustrated, the term "machine" shall also be taken to include a collection of machines that individually or jointly execute the instructions 1010 to perform any one or more of the methodologies discussed herein.

The machine 800 may include processors 804, memory memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 818 may include a wide variety of components to provide a user interface for receiving input, providing output, producing output, transmitting information, exchanging information, capturing measurements, and so on. The specific I/O components 818 that are included in the user interface of a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various exemplary embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 828 may also include one or more image-capturing devices, such as a digital camera for generating digital images or video.

In further exemplary embodiments, the I/O components 818 may include biometric components 830, motion components 834, environmental environment components 836, or position components 838, as well as a wide array of other components. One or more of such components (or portions thereof) may collectively be referred to herein as a "sensor component" or "sensor" for collecting various data related to the machine 800, the environment of the machine 800, a user of the machine 800, or a combination thereof.

For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, velocity sensor components (e.g., speedometer), rotation sensor components (e.g., gyroscope), and so forth. The environment components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 800, such as the system's 800 GPS coordinates or information regarding a location the system 1000 is at currently (e.g., the name of a restaurant or other business).

Communication may be implemented using a wide variety of technologies. The I/O components 818 may include communication components 840 operable to couple the machine 800 to a network 832 or devices 820 via coupling 822 and coupling 824 respectively. For example, the communication components 840 may include a network interface component or other suitable device to interface with the network 832. In further examples, communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a Universal Serial Bus (USB)).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as, location via Internet Protocol (IP) geo-location, location via Wi-Fi® signal triangulation, location via detecting an NFC beacon signal that may indicate a particular location, and so forth.

Figure 9:
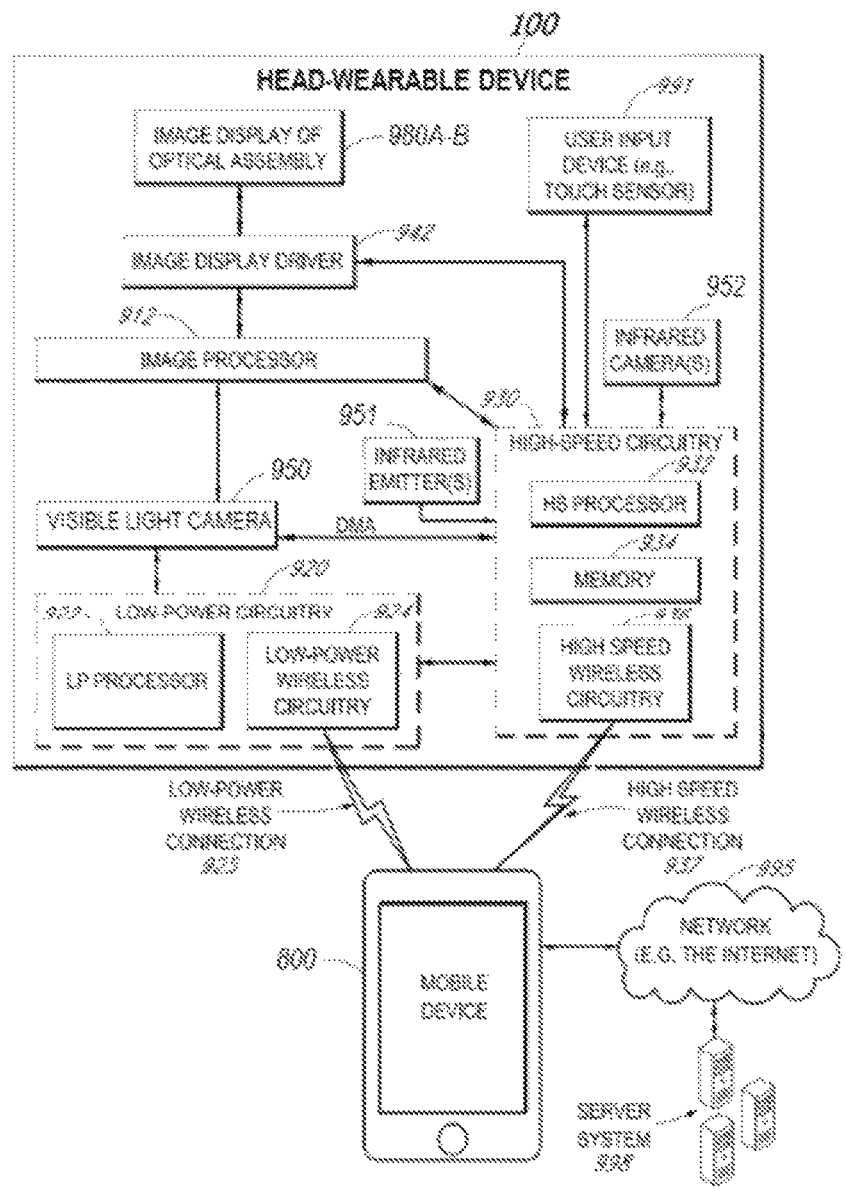
FIG. 9 is a high-level functional block diagram of an example head-wearable apparatus communicatively coupled a mobile device and a server system via various networks.

FIG. 9 is a high-level functional block diagram of an example head-wearable apparatus 100 communicatively coupled a mobile device 800 and a server system 998 via various networks.

Apparatus 100 includes a camera, such as at least one of visible light camera 950, infrared emitter 951 and infrared camera 952. The camera can include the camera module with the lens 104_1, 104_2 in FIGS. 1 and 2.

Client device 800 can be capable of connecting with apparatus 100 using both a low-power wireless connection 925 and a high-speed wireless connection 937. Client device 800 is connected to server system 998 and network 995. The network 995 may include any combination of wired and wireless connections.

Apparatus 100 further includes two image displays of the optical assembly 980A-B. The two image displays 980A-980B include one associated with the left lateral side and one associated with the right lateral side of the apparatus 100. Apparatus 100 also includes image display driver 942, image processor 912, low-power circuitry 920, and high-speed circuitry 930. Image display of optical assembly 980A-B are for presenting images and videos, including an image that can include a graphical user interface to a user of the apparatus 100.

Image display driver 942 commands and controls the image display of the optical assembly 980A-B. Image display driver 942 may deliver image data directly to the image display of the optical assembly 980A-B for presentation or may have to convert the image data into a signal or data format suitable for delivery to the image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

As noted above, apparatus 100 includes a frame 103 and stems (or temples) extending from a lateral side of the frame 103. Apparatus 100 further includes a user input device 991 (e.g., touch sensor or push button) including an input surface on the apparatus 100. The user input device 991 (e.g., touch sensor or push button) is to receive from the user an input selection to manipulate the graphical user interface of the presented image.

The components shown in FIG. 9 for the apparatus 100 are located on one or more circuit boards, for example a PCB or flexible PCB, in the rims or temples. Alternatively or additionally, the depicted components can be located in the chunks, frames, hinges, or bridge of the apparatus 100. Left and right visible light cameras 950 can include digital camera elements such as a complementary metal-oxide-semiconductor (CMOS) image sensor, charge coupled device, a lens 104_1, 104_2, or any other respective visible or light capturing elements that may be used to capture data, including images of scenes with unknown objects.

Apparatus 100 includes a memory 934 which stores instructions to perform a subset or all of the functions described herein for generating binaural audio content. Memory 934 can also include storage device 604. The exemplary process illustrated in the flowchart in FIG. 4 can be implemented in instructions stored in memory 934.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 980A-B. High-speed processor 932 may be any processor capable of managing high-speed communications and operation of any general computing system needed for apparatus 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the apparatus 100 and the operating system is stored in memory 934 for execution. In addition to any other responsibilities, the high-speed processor 932 executing a software architecture for the apparatus 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the apparatus 100 can include short range transceivers (Bluetooth™) and wireless wide, local, or wide area network transceivers (e.g., cellular or WiFi). Client device 800, including the transceivers communicating via the low-power wireless connection 925 and high-speed wireless connection 937, may be implemented using details of the architecture of the apparatus 100, as can other elements of network 995.

Memory 934 includes any storage device capable of storing various data and applications, including, among other things, camera data generated by the left and right visible light cameras 950, infrared camera 952, and the image processor 912, as well as images generated for display by the image display driver 942 on the image displays of the optical assembly 980A-B. While memory 934 is shown as integrated with high-speed circuitry 930, in other examples, memory 934 may be an independent standalone element of the apparatus 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

As shown in FIG. 9, the processor 932 of the apparatus 100 can be coupled to the camera (visible light cameras 950; infrared emitter 951, or infrared camera 952), the image display driver 942, the user input device 991 (e.g., touch sensor or push button), and the memory 934.

Apparatus 100 is connected with a host computer. For example, the apparatus 100 is paired with the client device 800 via the high-speed wireless connection 937 or connected to the server system 998 via the network 995. Server system 998 may be one or more computing devices as part of a service or network computing system, for example, that include a processor, a memory, and network communication interface to communicate over the network 995 with the client device 800 and apparatus 100.

The client device 800 includes a processor and a network communication interface coupled to the processor. The network communication interface allows for communication over the network 925 or 937. Client device 800 can further store at least portions of the instructions for generating a binaural audio content in the client device 800's memory to implement the functionality described herein.

Output components of the apparatus 100 include visual components, such as a display such as a liquid crystal display (LCD), a plasma display panel (PDP), a light emitting diode (LED) display, a projector, or a waveguide. The image displays of the optical assembly are driven by the image display driver 942. The output components of the apparatus 100 further include acoustic components (e.g., speakers), haptic components (e.g., a vibratory motor), other signal generators, and so forth. The input components of the apparatus 100, the client device 800, and server system 998, such as the user input device 991, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Apparatus 100 may optionally include additional peripheral device elements. Such peripheral device elements may include biometric sensors, additional sensors, or display elements integrated with apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the client device 800 via the low-power wireless circuitry 924 or high-speed wireless circuitry 936.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A head-wearable apparatus comprising:
   a frame that carries a pair of lenses;
   a first stem coupled to a first side of the frame and to a first microphone housing that encases a first front microphone and a first rear microphone that generate acoustic signals;
   a second stem coupled to a second side of the frame and to a second microphone housing that encases a second front microphone and a second rear microphone that generate acoustic signals; and
   a binaural audio processor that includes
   an audio codec to generate
   a first decoded acoustic signal based on the acoustic signals from the first front microphone and the first rear microphone, and
   a second decoded acoustic signal from the second front microphone and the second rear microphone; and
   a beamformer to generate
   a first beamformer signal based on the acoustic signals from the first front microphone and the first rear microphone, and
   a second beamformer signal based on the acoustic signals from the second front microphone and the second rear microphone, wherein the first beamformer signal and the second beamformer signal are stored as a two-channel file on a storage device.

2. The head-wearable apparatus of claim 1, wherein the beamformer receives the acoustic signals from the first front microphone, the first rear microphone, the second front microphone and the second rear microphone.

3. The head-wearable apparatus of claim 2, wherein the head-wearable apparatus is a pair of eyeglasses, wherein the first side of the frame is opposite the second side of the frame.

4. The head-wearable apparatus of claim 3, wherein the frame carries a pair of lenses and is coupled to a camera, wherein a camera lens of the camera faces forward.

5. The head-wearable apparatus of claim 1, wherein the beamformer is a fixed beamformer, wherein the fixed beamformer includes a fixed beam pattern that is sub-cardioid or cardioid.

6. The head-wearable apparatus of claim 1, wherein the first front microphone and the first rear microphone form a first order differential microphone array, and the second front microphone and the second rear microphone form a first order differential microphone array.

7. The head-wearable apparatus of claim 1,
wherein the storage device includes a flash storage device.

8. The head-wearable apparatus of claim 1, wherein the binaural audio processor is a Silicon-on-Chip (SoC).

9. The head-wearable apparatus of claim 8, further comprising:
a time-division multiplexer (TDM) to process the first decoded acoustic signal and the second decoded acoustic signal and to generate a TDM-processed signal.

10. The head-wearable apparatus of claim 9, wherein the acoustic signals generated by the first and second front microphones and the first and second rear microphones are pulse density modulation (PDM) signals.

11. The head-wearable apparatus of claim 10, wherein the first and second decoded acoustic signals are pulse code modulation (PCM) signals.

12. The head-wearable apparatus of claim 11, wherein the binaural audio processor further comprises:
a noise suppressor to suppress noise from the first beamformer signal and the second beamformer signal and to generate a first noise-suppressed signal and a second noise-suppressed signal.

13. The head-wearable apparatus of claim 12, wherein the binaural audio processor further comprises:
a speech enhancer to enhance speech from the first noise-suppressed signal and the second noise-suppressed signal to generate a first clean signal and a second clean signal, wherein the storage device stores the first clean signal and the second clean signal.

14. A pair of eyeglasses comprising:
a frame to carry a pair of lenses;
a camera coupled to the frame;
a first stem coupled to a first side of the frame and to a first microphone housing that encases a first front microphone and a first rear microphone that generate acoustic signals;
a second stem coupled to a second side of the frame and to a second microphone housing that encases a second front microphone and a second rear microphone that generate acoustic signals;
a binaural audio processor that includes
an audio codec to generate
a first decoded acoustic signal based on the acoustic signals from the first front microphone and the first rear microphone, and
a second decoded acoustic signal from the second front microphone and the second rear microphone; and
a beamformer to generate
a first beamformer signal based on the acoustic signals from the first front microphone and the first rear microphone, and
a second beamformer signal based on the acoustic signals from the second front microphone and the second rear microphone,
wherein the first beamformer signal and the second beamformer signal are stored as a two-channel file on a storage device.

15. The pair of eyeglasses of claim 14, wherein the binaural audio processor further comprises:
a noise suppressor to suppress noise from the first beamformer signal and the second beamformer signal and to generate a first noise-suppressed signal and a second noise-suppressed signal.

16. The pair of eyeglasses of claim 15, wherein the binaural audio processor further comprises:
a speech enhancer to enhance speech from the first noise-suppressed signal and the second noise-suppressed signal to generate a first clean signal and a second clean signal, wherein the storage device stores the first clean signal and the second clean signal.

17. The pair of eyeglasses of claim 14, wherein the beamformer is a fixed beamformer, wherein the fixed beamformer includes a fixed beam pattern that is sub-cardioid or cardioid.

18. The pair of eyeglasses of claim 14, further comprising:
a time-division multiplexer (TDM) to process the first decoded acoustic signal and the second decoded acoustic signal and to generate a TDM-processed signal.

19. A method of generating binaural audio content using a head-wearable apparatus comprising:
generating acoustic signals by a first front microphone and a first rear microphone, wherein the first front microphone and the first rear microphone are encased in a first microphone housing that is coupled to a first stem of the head-wearable apparatus;
generating acoustic signals by a second front microphone and a second rear microphone, wherein the second front microphone and the second rear microphone are encased in a second microphone housing that is coupled to a second stem of the head-wearable apparatus, wherein the first stem and the second stem are coupled to opposite sides of a frame of the head-wearable apparatus;
decoding, by a first audio codec, the acoustic signals from the first front microphone and the first rear microphone to generate a first decoded acoustic signal;
decoding, by a second audio codec, the acoustic signals from the second front microphone and the second rear microphone to generate a second decoded acoustic signal;
beamforming, by a beamformer, the acoustic signals from the first front microphone and the first rear microphone to generate a first beamformer signal; and
beamforming, by the beamformer, the acoustic signals from the second front microphone and the second rear microphone to generate a second beamformer signal, wherein the first beamformer signal and the second beamformer signal are stored as a two-channel file on a storage device.

20. The method of claim 19, wherein
the first decoded acoustic signal is a pulse code modulation (PCM) signal based on the acoustic signals from the first front microphone and the first rear microphone, and the second decoded acoustic signal is a PCM signal based on the acoustic signals from the second front microphone and the second rear microphone.

* * * * *